United States Patent
Tao et al.

(10) Patent No.: US 9,599,502 B2
(45) Date of Patent: Mar. 21, 2017

(54) MAGNETIC FIELD SENSOR FEEDBACK FOR DIAGNOSTICS

(71) Applicant: Fisher Controls International LLC, Marshalltown, IA (US)

(72) Inventors: Matthew Tao, Singapore (SG); CheeWee Goh, Singapore (SG)

(73) Assignee: Fisher Controls International LLC, Marshalltown, IA (US)

( * ) Notice: Subject to any disclaimer, the term of this patent is extended or adjusted under 35 U.S.C. 154(b) by 212 days.

(21) Appl. No.: 14/337,768

(22) Filed: Jul. 22, 2014

(65) Prior Publication Data

US 2016/0025548 A1    Jan. 28, 2016

(51) Int. Cl.
| | |
|---|---|
| *G01R 33/06* | (2006.01) |
| *G01F 25/00* | (2006.01) |
| *G01D 3/08* | (2006.01) |
| *G01D 5/14* | (2006.01) |
| *G01F 23/38* | (2006.01) |

(52) U.S. Cl.
CPC ............ *G01F 25/0061* (2013.01); *G01D 3/08* (2013.01); *G01D 5/145* (2013.01); *G01F 23/38* (2013.01)

(58) Field of Classification Search
CPC ............ F16H 59/10; G01B 7/30; G01D 5/145
USPC ........................................................ 324/251
See application file for complete search history.

(56) References Cited

U.S. PATENT DOCUMENTS

| | | | |
|---|---|---|---|
| 5,544,000 A | 8/1996 | Suzuki et al. | |
| 7,190,159 B2 * | 3/2007 | Galbreath | G01D 5/145 324/207.2 |
| 7,609,056 B2 * | 10/2009 | Junk | F16K 37/0033 137/553 |
| 2007/0090831 A1 | 4/2007 | Matsumoto et al. | |

FOREIGN PATENT DOCUMENTS

DE       102013110703       5/2014

OTHER PUBLICATIONS

Emerson Process Management, "Fisher FIELDVUE DVC6200 Digital Valve Controller," Instruction Manual, Dec. 2013, 148 pages.
Emerson Process Management, "Fisher 4320 Automate Your Valves Without Wires," Feb. 2014, 16 pages.
Emerson Process Management, "Fisher 249 Caged Displacer Sensors," Instruction Manual, Aug. 2014, 20 pages.
Emerson Process Management, "Fisher FIELDVUE DLC3010 Digital Level Controller," Product Bulletin, Jul. 2012, 16 pages.
Emerson Process Management, "Fisher FIELDVUE DLC3010 Digital Level Controller," Instruction Manual, Sep. 2013, 124 pages.

(Continued)

*Primary Examiner* — Reena Aurora
(74) *Attorney, Agent, or Firm* — Hanley, Flight & Zimmerman, LLC

(57) ABSTRACT

Magnetic field sensor feedback for diagnostics is disclosed herein. A disclosed example apparatus includes a first magnetic field sensor to provide a first output signal in response to a magnetic field generated by a magnet coupled to a movable portion of a process control device, and a second magnetic field sensor to provide a second output signal in response to the magnetic field. The disclosed example apparatus also includes a processor to use the first and second output signals to generate diagnostic information associated with a feedback of the process control device.

20 Claims, 7 Drawing Sheets

(56) References Cited

OTHER PUBLICATIONS

Emerson Process Management, "Fisher Level Instruments," Product Bulletin, Nov. 2013, 16 pages.
Patent Cooperation Treaty, "International Search Report", issued in connection with PCT Patent Application No. PCT/US2015/041569, mailed on Oct. 28, 2015, 4 pages.
Patent Cooperation Treaty, "Written Opinion", issued in connection with PCT Patent Application No. PCT/US2015/041569, mailed on Oct. 28, 2015, 5 pages.

* cited by examiner

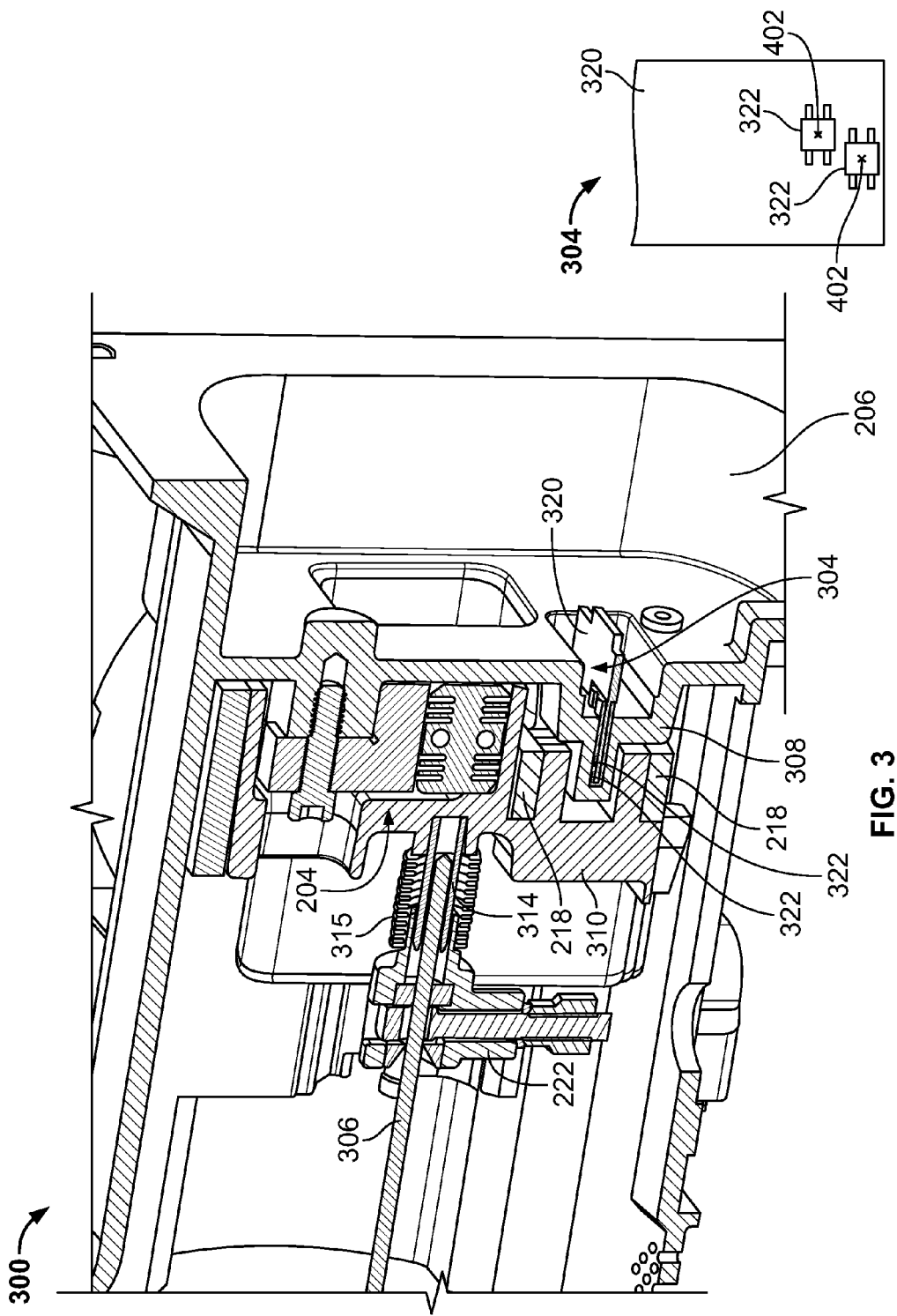

MAGNETIC FIELD SENSOR FEEDBACK FOR DIAGNOSTICS

FIELD OF THE DISCLOSURE

This patent relates generally to magnetic field sensors and, more particularly, to magnetic field sensor feedback for diagnostics.

BACKGROUND

Digital level controllers typically include a displacer (e.g., a floater) that responds to a fluid level and/or a density by moving linearly. The linear motion of the displacer is transferred to rotational motion of a torque tube that displace a lever assembly with an attached magnet or a group of magnets (e.g., two to forty magnets, etc.). Movement of one or more of the magnets alters a magnetic field measured at a Hall-effect sensor, which causes the Hall-effect sensor to provide an output signal that may be used to determine a process control value (e.g., a displacement measurement of the fluid). Typically, a single Hall-effect sensor is placed in a digital level controller to detect movement of the magnet (s). In practice, it is often difficult to determine or diagnose whether the Hall-effect sensor, the magnet(s), or other components of such level controllers have degraded in performance or are malfunctioning without inspection, disassembly of the digital level controller and/or removal of the entire digital level controller.

SUMMARY

One described example apparatus includes a first magnetic field sensor to provide a first output signal in response to a magnetic field generated by a magnet coupled to a movable portion of a process control device, and a second magnetic field sensor to provide a second output signal in response to the magnetic field. The example apparatus also includes a processor to use the first and second output signals to generate diagnostic information associated with a feedback of the process control device.

An example method includes generating, at a first magnetic field sensor, a first output signal in response to a magnetic field source generated by a magnet of a sensor system, generating, at a second magnetic field sensor, a second output signal in response to the magnetic field source and generating, using a processor, diagnostic information of an operating condition of the sensor system based on the first and second output signals.

An example tangible machine readable medium has instructions stored thereon, which when executed, cause a machine to measure a first output signal generated at a first magnetic field sensor, where the first output signal is generated in response to a magnetic field generated by a magnetic field source of a sensor system, measure a second output signal generated at a second magnetic field sensor, where the second output signal is generated in response to the magnetic field, and generate diagnostic information based on the first and second output signals to determine an operating condition of the sensor system.

BRIEF DESCRIPTION OF THE DRAWINGS

FIG. 3 is a cross-sectional view of an example magnetic field sensor system in accordance with the teachings of this disclosure.

FIG. 4 is a partial view of an example printed circuit board of the magnetic field sensor system of FIG. 3.

Figure 1:
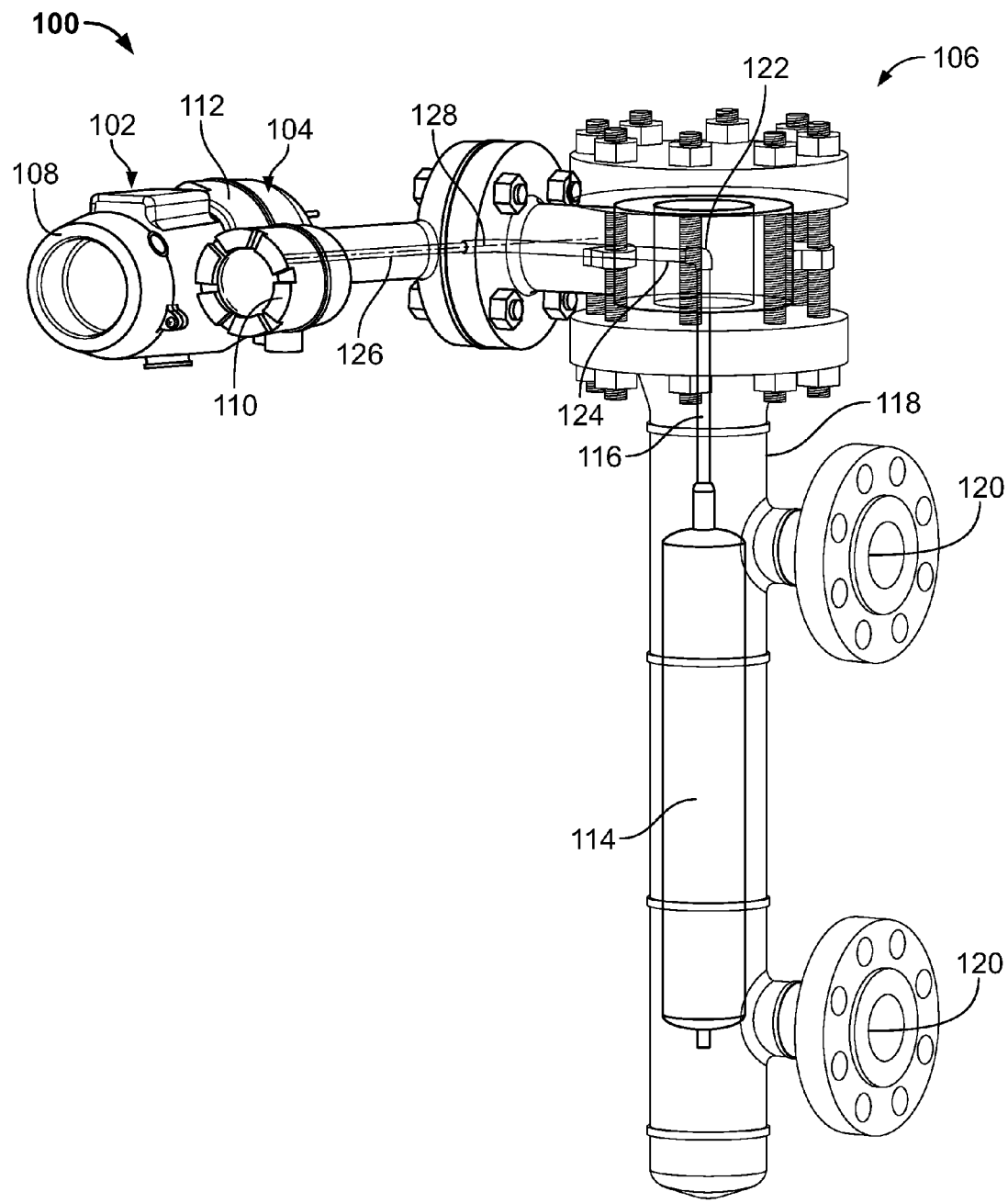
FIG. 1 is a view of a digital level sensor system in which the examples disclosed may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Magnetic field sensor feedback for diagnostics is disclosed herein. The examples disclosed herein enable a sensor system to generate diagnostic information of an operating condition of the sensor system. The examples disclosed herein utilize multiple magnetic field sensors (e.g., Hall-effect sensors) to measure a magnetic field, which may be provided by and/or affected by a magnetic field source such as a magnet on a movable part of a process control device, for example. The magnetic field sensors of the examples disclosed herein provide output signals (e.g., voltage signals) that are used to generate diagnostic information associated with a feedback of the process control device.

Many known sensor systems (e.g., digital level instruments) have a group of magnets on a movable part and a single Hall-effect sensor to determine a displacement of the magnets by a change in a magnetic field as the magnets move. However, specific causal determinations of malfunction in these systems is difficult because these systems may fail in a manner that does not indicate how the system failed. In particular, it is difficult to determine whether the magnets, the Hall-effect sensor, or any other component has failed. Additionally, visual inspection of such sensor systems may not be practical such as in applications where the sensor systems are difficult to reach.

The examples disclosed herein enable failure detection including, but not limited to, mechanical or electrical failure of the feedback of a process control device. By monitoring a relationship of the output signals provided by magnetic field sensors, a specific failure mode may be determined (e.g., magnet failure, failure of one or more of the magnetic field sensors, failure of electrical circuitry and/or electrical components, mechanical failure, etc.). In some examples, the relationship between output signals of the magnetic field sensors is to be periodically measured to generate diagnostic information of an operating condition of the sensor system and/or to monitor (e.g., periodically measure, repeatedly measure, etc.) operation of the sensor system.

In some examples, a magnetic field source (e.g., a magnet) is fixed to a movable lever (e.g., lever arm) of a sensor system, and first and second magnetic field sensors (e.g., Hall-effect sensors) are positioned on and/or mounted to a printed circuit board (PCB) and provided with a constant current or voltage source. In these examples, a processor uses first and second output signals (e.g., output voltages) generated in response to the magnetic field by the first and second magnetic field sensors, respectively, to generate diagnostic information. In some examples, the processor is to monitor a relationship (e.g., a linear relationship) between the first and second output signals. In some examples the processor compares a calculated ratio between the first and second output signals to a stored ratio and/or a range of ratios to determine if the sensor system is operating normally.

FIG. 1 is a view of a digital level sensor system 100 in which the examples disclosed may be implemented. The digital level sensor system 100 of the illustrated example is used to measure and/or monitor a height of a fluid, changes in the height of the fluid, changes in density of a liquid, and/or a level of an interface between two fluids. In this example, the digital level sensor system 100 includes a digital level controller assembly 102 and a displacement sensor assembly 106.

The digital level controller assembly 102 includes an indicator 108, a terminal box 110 and a transducer 112. The displacement sensor assembly 106 includes a displacer (e.g., floater) 114, a displacer stem 116, a casing 118 with openings 120, a displacer stem end piece 122, a displacer rod 124, and a torque tube 126.

In operation, fluid may flow through one or more of the openings 120 to be in contact with the displacer 114, which may displace due to its buoyancy in the fluid, density changes of the fluid and/or interface changes between fluids. Displacement of the displacer 114, in turn, causes the displacer stem 116 and the displacer stem end piece 122 to move linearly (e.g., an upward or downward direction in the view of FIG. 1), thereby causing the displacer rod 124 to pivot about an axis 128. The pivoting of the displacer rod 124 causes rotational motion of the torque tube 126 via a driver bearing, for example. The displacer rod 124 may be integral with the torque tube 126, for example. In some known examples, the rotation of the torque tube 126 then causes a lever assembly, which may be coupled to the torque tube 126, and one or more magnets attached to the lever assembly to rotate, thereby altering a magnetic field that is detected by a single magnetic field sensor in the digital level controller assembly 102. In these known examples, a processor in the digital level controller assembly 102 receives an input signal (e.g., output voltage) from the magnetic field sensor and converts the input signal to a process control value (e.g., a displacement value of the displacer 114, fluid parameter value, etc.), mode, and/or diagnostic message to be displayed on the indicator 108, which may have an LED (light emitting diode) or LCD (liquid crystal display), for example.

Figure 2:
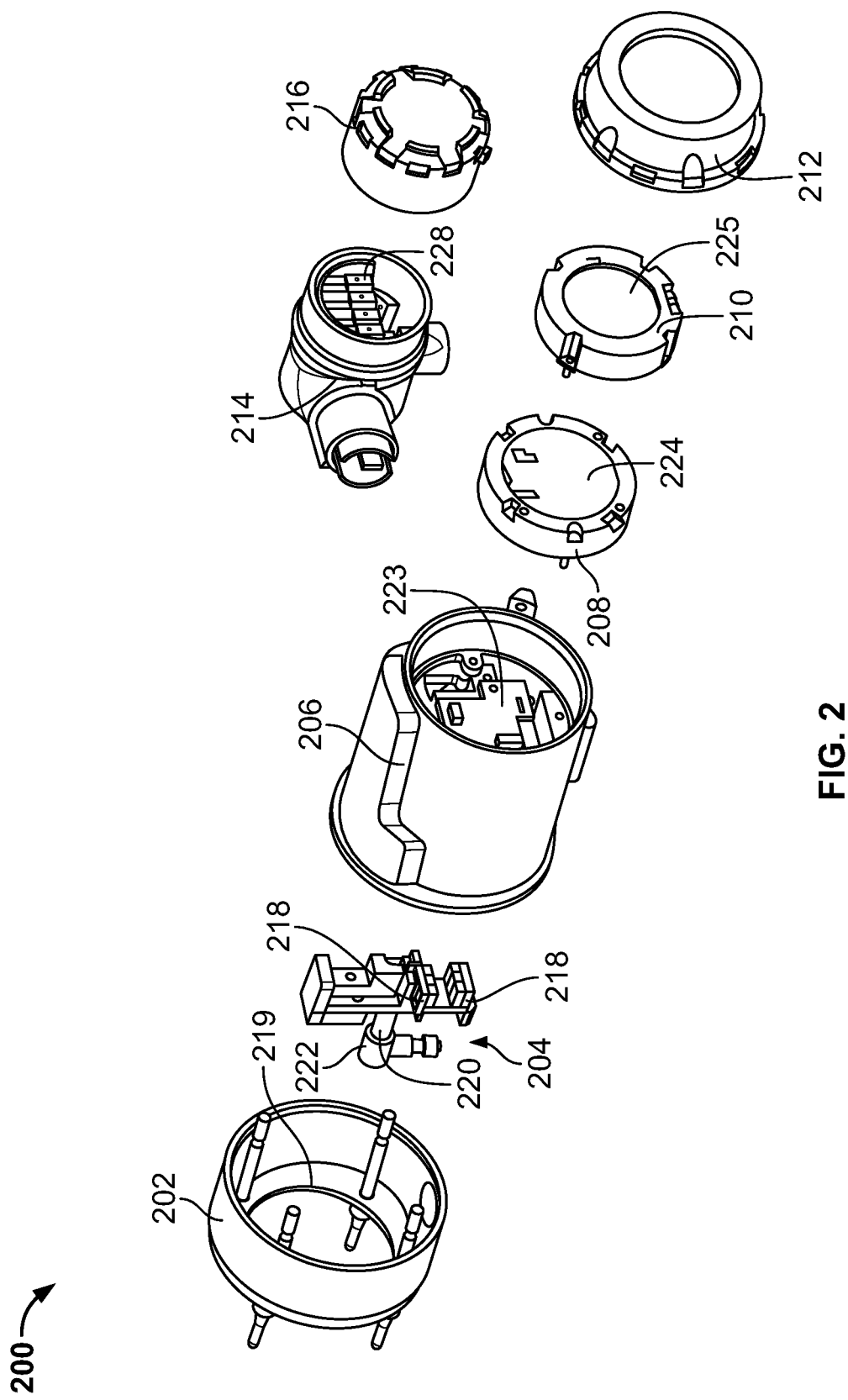
FIG. 2 is an exploded view of a sensor assembly in which the examples disclosed may be implemented.

FIG. 2 is an exploded view of a digital level sensor assembly 200 in which the examples disclosed may be implemented. Similar to the digital level controller assembly 102 described above in connection with FIG. 1, the digital level sensor assembly 200 receives magnetic field measurements provided and/or altered by a magnetic field source (e.g., a magnet, electro-magnet, etc.) to generate an output such as process control values and/or electrical signals to be communicated via a terminal and/or displayed on an indicator, for example. The digital level sensor assembly 200 of the illustrated example includes an adapter ring 202, a lever assembly 204, a transducer assembly 206, an electronics module 208, an LCD meter assembly 210, a cover 212, a terminal box 214 and a terminal box cover 216.

In this example, the lever assembly 204 includes magnets 218, a rotatable shaft 220 and a torque tube coupler 222. The adapter ring 202, which may couple to a displacement sensor assembly, has an aperture 219 to allow a torque tube of a process control device to pass therethrough and couple to the torque tube coupler 222. The transducer assembly 206 includes a transducer board 223. The electronics module 208 of the illustrated example includes a printed circuit board (PCB) 224. The LCD meter assembly 210 includes a display (e.g., an LCD panel, etc.) 225 that may be used as an indicator to show a process control value based on an amount of rotation of the torque tube and/or the lever assembly 204 to a user. The terminal box 214 includes terminals 228, which may be used to connect field wiring for monitoring, maintenance and/or service.

FIG. 3 is a cross-sectional view of an example magnetic field sensor system 300 in accordance with the teachings of this disclosure. The magnetic field sensor system 300 includes the lever assembly 204 described above in connection with FIG. 2, a printed circuit board (PCB) assembly 304, a torque tube 306 and a housing 308 of the transducer assembly 206. The lever assembly 204 of the illustrated example includes a lever body 310, a magnetic field source such as the magnets 218, for example, a torque tube sleeve 314, a spring 315, and the torque tube coupler 222 to couple the torque tube 306 to the lever assembly 204. The PCB assembly 304 includes a PCB 320 and magnetic field sensors (e.g., Hall-effect sensors) 322 positioned on (e.g., mounted to, soldered to, etc.) the PCB 320. The magnetic field sensors 322 may be electrically coupled together and/or serially coupled to a constant current power source, which allows greater efficiency (e.g., electrical efficiency). Alternatively, in some examples, each of the magnetic field sensors 322 are coupled to distinct constant current power sources. While the magnetic field sensors 322 of the illustrated example are described as being mounted to the PCB 320, the magnetic field sensors 322 may be positioned anywhere in the magnetic field sensor system 300 (e.g., on separate PCBs, wired to different positions on the housing 308, etc.).

In operation, the torque tube 306 of the illustrated example rotates via a displacement sensor assembly such as the displacement sensor assembly 106 described above in connection with FIG. 1, for example, to generate feedback resulting from (e.g., converted from) linear displacement of a movable part and/or assembly (e.g., a flotation device such as the displacer 114 of the displacement sensor assembly 106). This rotation of the torque tube 306, in turn, causes the lever body 310 and, thus, the magnets 218 to rotate, thereby altering (i.e., changing, affecting) a magnetic field detected at the magnetic field sensors 322. In this example, detection of the magnetic field value(s) and/or change in the magnetic field enables a processor of the magnetic field sensor system 300 to determine and/or detect movement (e.g., displacement, an amount of displacement, etc.) of the torque tube 306 and/or the lever assembly 204, which may be caused by movement of the movable part and/or assembly. The output signals from the magnetic field sensors 322 are different (e.g., varied) from one another and/or the output signals may behave differently across a range of motion (e.g., a range of movement) of the lever assembly 204. The differences in output signals and/or output signal behaviors may be due to positional offsets of the magnetic field sensors 322 (e.g., positional offsets along two or more directions of the PCB 320). One or more of the output signals may be used to determine a process control value. For example, the processor may average the output signals together or calculate a weighted average of the output signals to determine a process control value.

In this example, the relationship between the output signals of the magnetic field sensors is to be monitored (e.g., continuously or periodically measured, etc.) by the processor, which may be positioned on (e.g., soldered to) the PCB assembly 304, to generate diagnostic information of an operating condition of a feedback of the magnetic field sensor system 300. In other words, a relationship and/or difference between the output signals of the magnetic field sensors 322 is monitored by the processor throughout a range or a portion of the range of angular motion of the torque tube 306 and/or the lever assembly 204. In this example, the relationship and/or differences between the output signals of the magnetic field sensors 322 indicate and/or enable generation of diagnostic information (e.g., diagnostic information associated with a feedback of a process control device) such as, for example, whether one of the magnetic field sensors 322 has failed and/or whether one of the magnets 218 has become uncoupled or detached from the lever body 310, has degraded and/or is not functioning properly (e.g., damaged, etc.). Additionally or alternatively, certain behavior of the output signals (e.g., shifts of both output signals, etc.) or lack of the output signals may indicate electrical failure. The relationship between the output signals of the magnetic field sensors 322 is described in greater detail in connection with FIGS. 5 and 6 below. In some examples, to correct for the effects of temperature on the magnetic field sensors 322 (e.g., temperature variance) in determining a process control value, the temperature effects may be compensated for by adjusting the expected relationship between the output signals of the magnetic field sensors 322 to account for temperature, temperature drift, and/or measured temperatures, for example. In this example, a transducer board such as the transducer board 223 described above in connection with FIG. 2 allows terminals to be accessed at a terminal such as the terminals 228 to enable communication of output signals and/or voltages, etc.

FIG. 4 is a partial view of the example printed circuit board (PCB) assembly 304 of the example magnetic field sensor system 300 of FIG. 3. As mentioned above, the PCB assembly 304 includes a PCB 320 with magnetic field sensors 322. The magnetic field sensors are arranged offset to one another in two different directions along the plane of the PCB 320 to provide different output signals based on a magnetic field. In some examples, the magnetic field sensors 322 are placed on opposite sides of the PCB 320. Magnetic flux lines directed into the Xs in FIG. 4 may be detected by the magnetic field sensors 322. While a positional offset in one or more directions of the magnetic field sensors 322 is used to provide different (e.g., offset) output signals of the magnetic field sensors 322, additionally or alternatively, other methods or processes may be used to provide different output signals including different sensors, different materials surrounding and/or around each of the magnetic field sensors 322, etc. While two of the magnetic field sensors 322 are shown in this example, any appropriate number (e.g., three, four, five, etc.) of the magnetic field sensors 322 may be used to generate diagnostic information.

Figure 5:
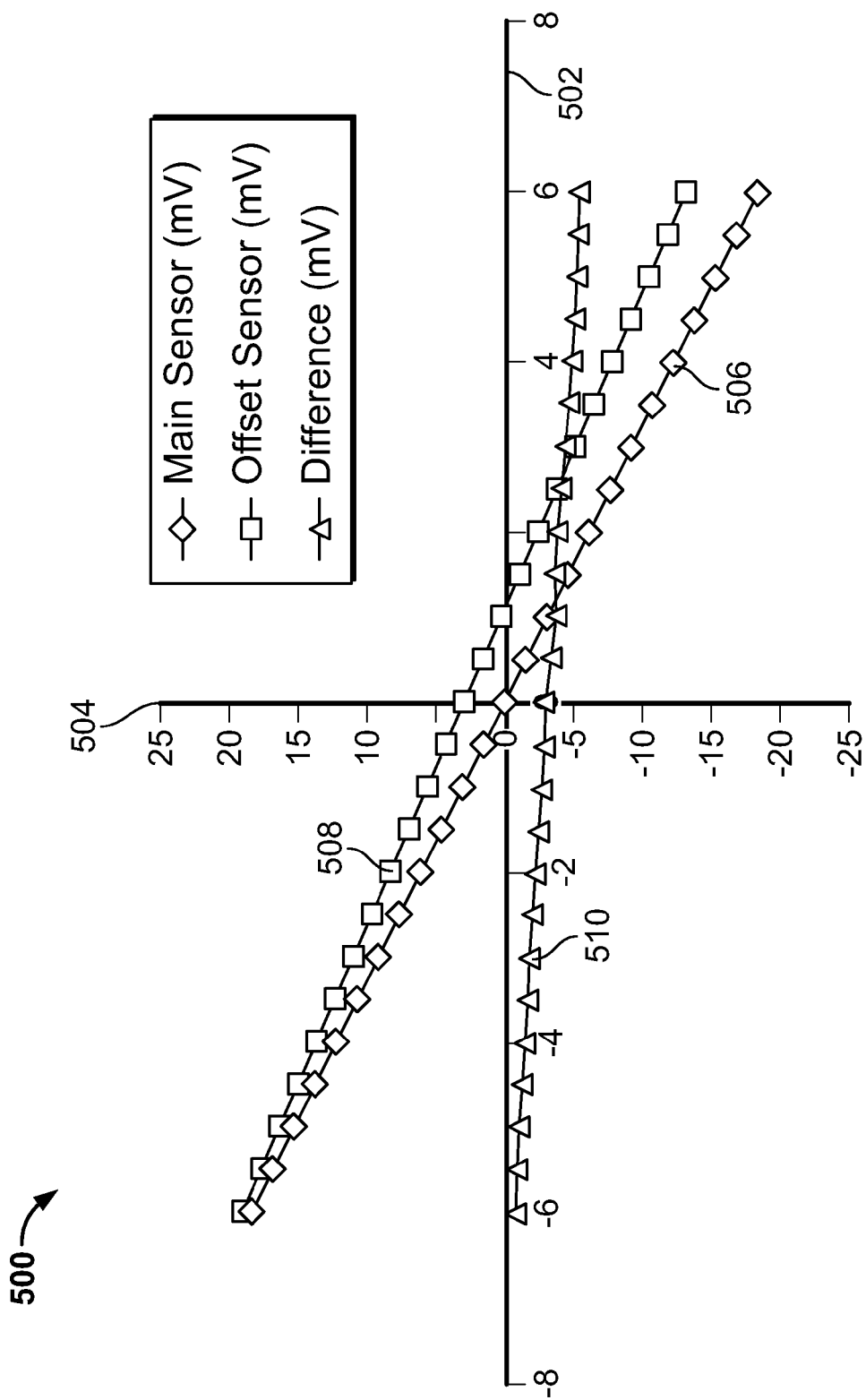
FIG. 5 is a graph depicting output voltages of a main sensor and an offset sensor with respect to a varying magnetic field of the examples disclosed herein.

FIG. 5 is a graph 500 depicting output voltages of a main sensor and an offset sensor with respect to a varying magnetic field of the examples disclosed herein. A horizontal axis 502 represents angular displacement in degrees of a magnetic field source (e.g., a magnet, a group of magnets, etc.) positioned on a movable lever assembly, for example. A vertical axis 504 represents output voltage in millivolts (mV). A first line 506 represents the output voltage of a main magnetic field sensor with respect to the angular displacement of the magnetic field source. Likewise, a second line 508 represents the output voltage of an offset magnetic field sensor with respect to the angular displacement. The second line 508 of the illustrated example is positionally offset and has a different slope from the first line 506 of the main magnetic field sensor. A third line 510 represents a difference (i.e., a delta) between the output voltages of the main magnetic field sensor and the offset magnetic field sensor. The output voltages of the main magnetic field sensor and the offset magnetic field sensor vary across the angular range of motion of the magnet on the lever assembly. One or more of the output voltages may be used to determine (e.g., calculate) a process control value.

In this example, the output signals are monitored by a processor to determine whether the output signals of the main magnetic field sensor and the offset magnetic field approximate (e.g., are within error, are within an error band, etc.) of the first line 506 and the second line 508, respectively. In some examples, the difference between the first line 506 and the second line 508 is characterized and/or periodically measured or monitored across a range of angular motion of the magnetic field source. Additionally or alternatively, the third line 510 representing the difference between output voltages of the main and offset magnetic field sensors is to be characterized and/or periodically measured or monitored across the entire range of motion of the magnetic field source. In some examples, the output signals and/or the relationship between the output signals (e.g., a ratio of the output signals) of the magnetic field sensors may be compared to stored data, which may correspond to a normal operating condition of the feedback, to generate diagnostic information. In some examples, a ratio of the output signals of the magnetic field sensors is periodically and/or continuously compared to a stored ratio.

Having multiple magnetic field sensors allows diagnostic information of the sensor feedback system to be generated and/or determined. For example, a single magnetic field sensor may malfunction and, thus, not provide an output signal within an expected range (e.g., within expected parameters) while a second magnetic field sensor, which is operating correctly, continues to output an output signal within its expected range, thereby indicating that the first magnetic field sensor has malfunctioned and/or power to the first magnetic field sensor has ceased or is inadequate, which may indicate partial circuit failure, for example. Likewise, in some examples, incorrect or out-of-range output signals from both magnetic field sensors, which may be unlikely, indicates that the magnet has failed (e.g., has been damaged), both of the magnets have failed or are damaged, that circuitry to process the output signals of the magnetic field sensors has malfunctioned, and/or circuitry to power the magnets has failed. A change in relationship of the output signals and/or changes in slopes of one or more of the output signals (e.g., the lines 506 and 508), may indicate that a magnet (e.g., magnet strength) has degraded. In other words, a change in the magnetic field provided by the magnet due to the magnet being removed from a lever, for example, may result in both output signal lines (e.g., the lines 506 and 508) shifting. In some examples, both output signals shifting to approximately zero may indicate electrical failure (e.g., electrical circuit failure, electrical component failure, etc.). In contrast, systems having only a single magnetic field sensor may not allow such diagnostic information to be generated because a failure of an output signal does not generally indicate whether the magnetic field sensor has failed, the magnet has failed (e.g., has become damaged or degraded), the circuitry receiving the output signal of the magnetic field sensor has failed and/or the circuitry powering the magnetic field sensor has failed.

Figure 6:
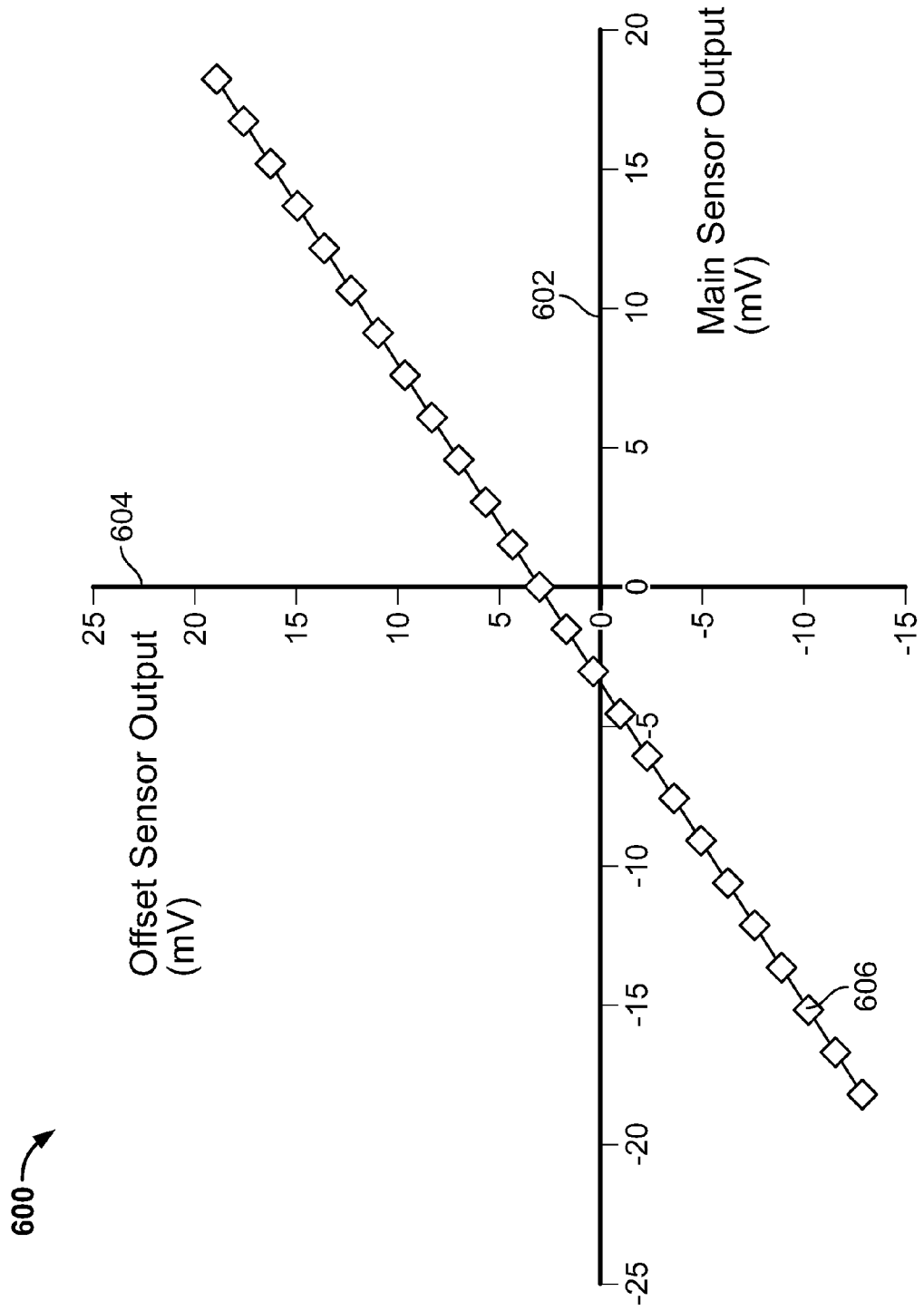
FIG. 6 is a graph depicting offset sensor output voltage with respect to main sensor output voltage of the examples disclosed herein.

FIG. 6 is a graph 600 depicting offset sensor output voltage with respect to main sensor output voltage of the examples disclosed herein. A horizontal axis 602 represents output voltage in millivolts (mV) of a main sensor. A vertical axis 604 represents output voltage in millivolts (mV) of an offset sensor. In this example, a line 606, which is linear, represents the output voltage of the main magnetic field sensor relative to the offset sensor. The graph 600 is an example of a relationship between the magnetic field sensors that may be monitored or periodically measured. In particular, the output signals of the main and offset sensors may be continuously compared, by a processor, to the line 606 (e.g., within error of the line 606).

In this example, a deviation of the line 606 (e.g., shifts or shape changes of the line 606, etc.) may indicate malfunction of one or more of the magnetic field sensors and/or failure of a magnet. In some examples, a shift in the slope of the line 606 may indicate a failure of one of the magnetic field sensors and/or degradation of the magnet. A change in overall shape of the line 606 (e.g., one or more of the output voltages becomes zero) may indicate a failure of one or more of the magnetic field sensors. In some examples, relationship(s) such as those shown in graphs 500 and 600 may be stored in memory of a monitoring device, for example, as a table (e.g., a table with two or more columns).The monitoring device may periodically and/or continuously sample the output signals of the main and offset magnetic field sensors to verify the sampled output values against the table to verify that the relationship between the output signals is maintained (e.g., maintained within error of the line 606) per the relationship seen in the graph 600. In some examples, one or more of the magnetic field sensors may be adjusted (e.g., optimized, calibrated, etc.) to improve linearity of and/or a relationship between output signal(s) by varying the magnetic field during production or assembly to monitor a response of the output signal(s), and adjusting (e.g., compensating) the output signal(s) to correct non-linear behavior (e.g., irregularities in the output signal(s)) and/or improve the linearity of the output signal(s), for example. In some examples, one or more of the magnetic field sensors are positioned (e.g., placed) appropriately to improve linearity of and/or a relationship between output signal(s).

Figure 7:
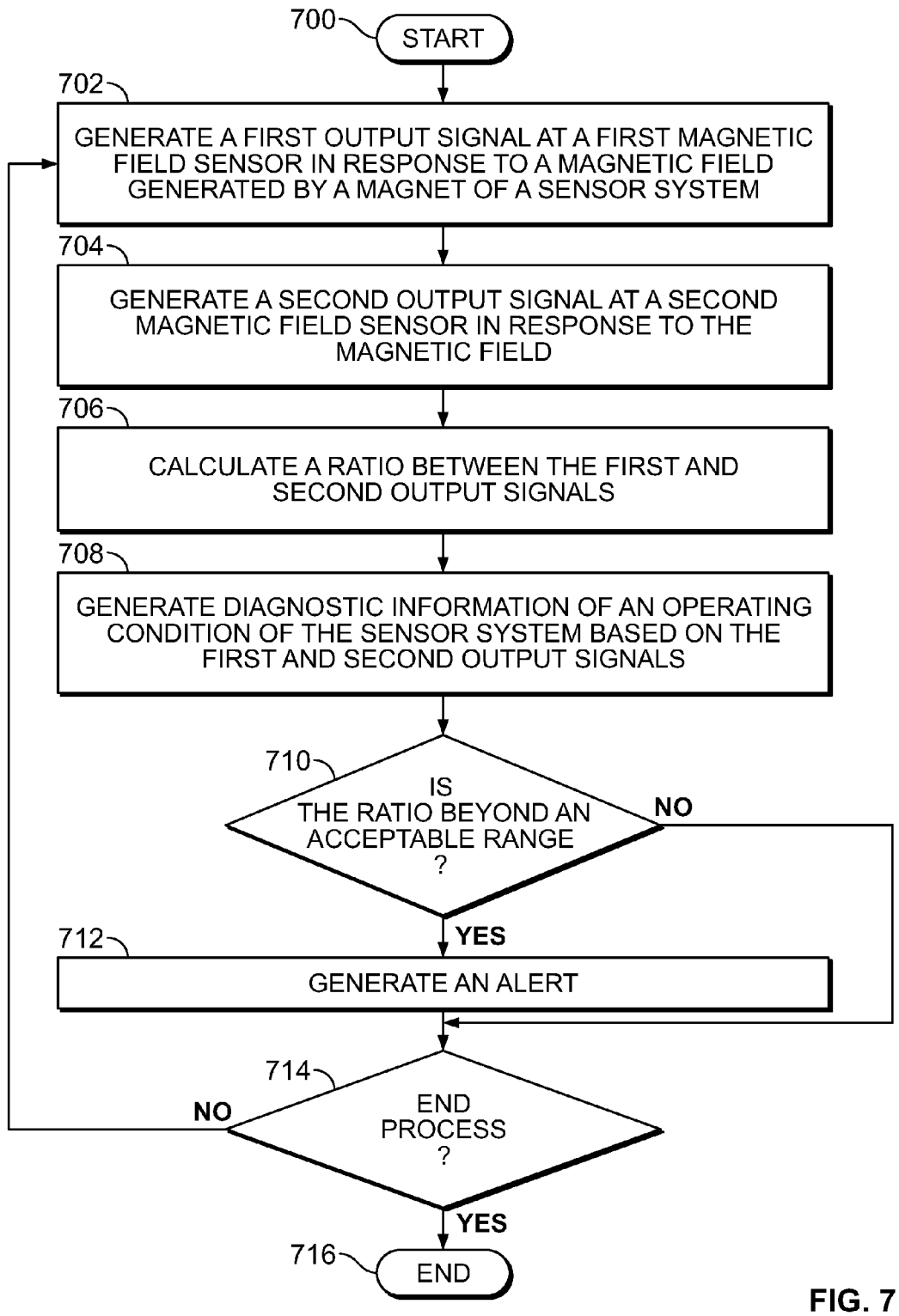
FIG. 7 is a flowchart representative of an example method that may be used to implement the magnetic field system of FIG. 3.

A flowchart representative of an example method for implementing the magnetic field sensor system 300 of FIG. 3 is shown in FIG. 7. In this example, the method may be implemented using machine readable instructions that comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example magnetic field sensor system 300 may alternatively be used. For example, the order of execution of the blocks may be changed, and/or some of the blocks described may be changed, eliminated, or combined.

As mentioned above, the example method of FIG. 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The method of FIG. 7 begins at block 700 where a magnetic field of a sensor system is generated by and/or altered by a magnetic field source (e.g., the magnets 218) on a movable part (e.g., the lever assembly 204) (block 700). A first output signal is generated at a first magnetic field sensor such as one of the magnetic field sensors 322 described above in connection with FIG. 3 in response to the magnetic field. Next, a second output signal at a second magnetic field sensor (e.g., one of the magnetic field sensors 322) is generated in response to the magnetic field (block 704). In some examples, a ratio between the first and second output signals is then calculated (block 706). Next, diagnostic information of an operating condition of the sensor system is generated by a processor based on one or more of the first and second output signals, the ratio of the first and second output signals and/or any relationships such as expected behavior of the first and second input signals relative to one another such as those shown in the graphs 500 and 600 described above in connection with FIGS. 5 and 6, respectively (block 708). In some examples, if the ratio is beyond an acceptable range (block 710), an alert is generated (block 712) at an indicator such as the indicator 108 shown above in connection with FIG. 1, and it is determined whether to end the process (block 714). In some examples, if the ratio is within the acceptable range, then it is determined whether or not to end the process (block 714). If it is determined that the process is not to end (block 714), the process repeats (block 702). Alternatively, if it is determined that the process is to end (block 714), the process ends (block 716).

Figure 8:
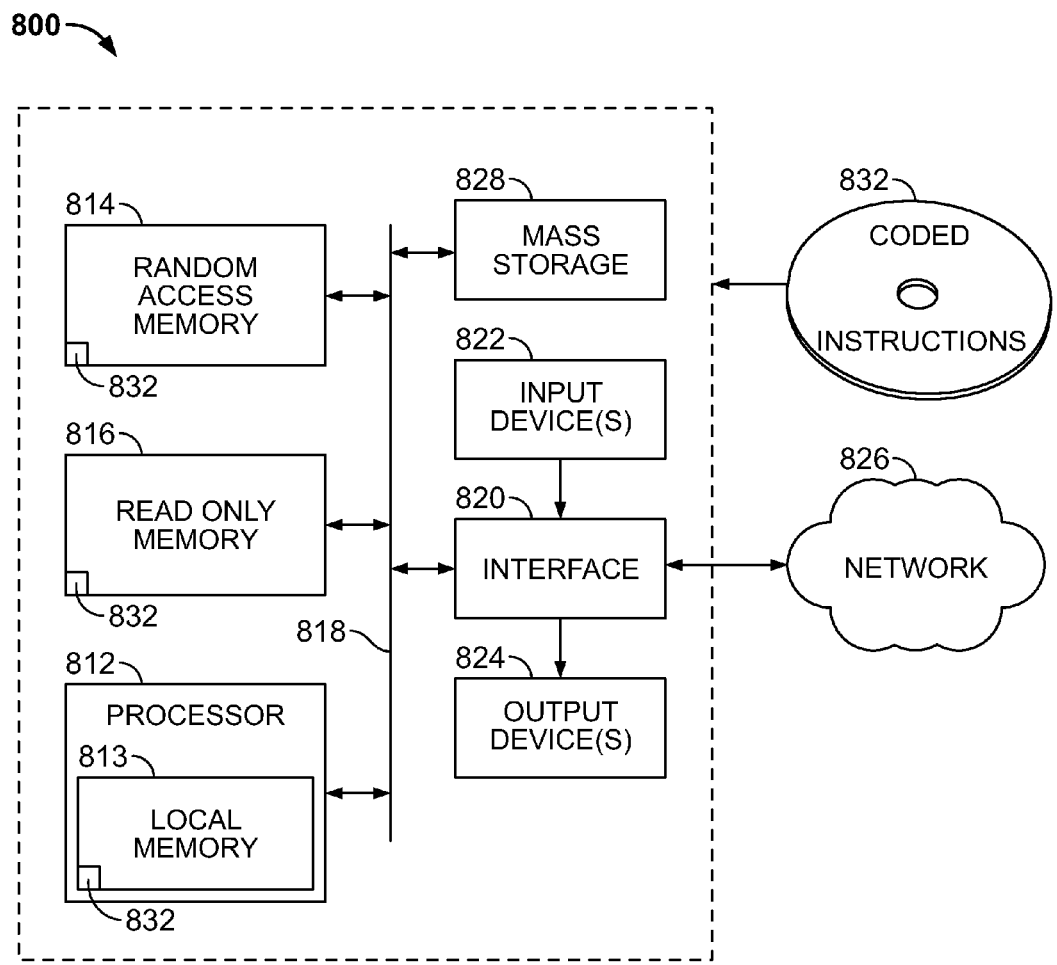
FIG. 8 is a block diagram of an example processor platform capable of executing machine readable instructions to implement the example method of FIG. 7.

FIG. 8 is a block diagram of an example processor platform 800 capable of executing instructions to implement the method of FIG. 7 and, more generally, the magnetic field sensor system 300 of FIG. 3. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device (s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 to implement the method of FIG. 7 may be stored in the mass storage device 828, in the volatile memory 814, in the non-volatile memory 816, and/or on a removable tangible computer readable storage medium such as a CD or DVD.

Although certain example apparatus and methods have been described herein, the scope of coverage of this patent is not limited thereto. On the contrary, this patent covers all methods, apparatus and articles of manufacture fairly falling within the scope of the amended claims either literally or under doctrine of equivalents. While process control devices are described in the examples disclosed herein, the examples disclosed herein may be applied to any sensor system utilizing magnetic field source(s).

What is claimed is:

1. An apparatus comprising:
a first magnetic field sensor to provide a first output signal in response to a magnetic field generated by a magnet coupled to a movable portion of a process control device;
a second magnetic field sensor to provide a second output signal in response to the magnetic field; and
a processor to compare a detected differential relationship of the first and second output signals over a range of motion of the magnet to a characteristic differential relationship between the first and second output signals that varies over the range of motion to generate diagnostic information associated with a feedback of the process control device.

2. The apparatus as defined in claim 1, wherein the first and second magnetic field sensors are Hall-effect sensors.

3. The apparatus as defined in claim 1, further comprising a constant current source to power the first and second magnetic field sensors.

4. The apparatus as defined in claim 1, wherein the first and second magnetic field sensors are fixed to a printed circuit board.

5. The apparatus as defined in claim 1, wherein the processor is to use the first and second output signals by comparing the first and second output signals to stored data to generate the diagnostic information.

6. The apparatus as defined in claim 5, wherein the stored data corresponds to a normal operating condition of the feedback.

7. The apparatus as defined in claim 5, wherein the processor is to compare a ratio the first and second output signals to a stored ratio.

8. The apparatus as defined in claim 1, wherein the diagnostic information corresponds to at least one of a mechanical failure or an electrical failure of the feedback.

9. The apparatus as defined in claim 1, wherein the movable portion of the process control device is a lever arm.

10. The apparatus as defined in claim 1, wherein the first and second magnetic field sensors are serially coupled to a power source.

11. The apparatus as defined in claim 1, wherein the detected differential relationship is a linear relationship between the first and second output signals over the range of motion of the magnet.

12. The apparatus as defined in claim 11, wherein the characteristic differential relationship corresponds to a linear relationship over the range of motion of the magnet.

13. The apparatus as defined in claim 1, wherein the characteristic differential relationship corresponds to a curve representing a difference between the first and second output signals over the range of motion of the magnet.

14. A method comprising:
   generating, at a first magnetic field sensor, a first output signal in response to a magnetic field source generated by a magnet of a sensor system;
   generating, at a second magnetic field sensor, a second output signal in response to the magnetic field source; and
   generating, using a processor, diagnostic information of an operating condition of the sensor system based on the first and second output signals by comparing a detected differential relationship between the first and second output signals over a range of motion of the magnet to a characteristic differential relationship between the first and second output signals that varies over the range of motion.

15. The method as defined in claim 14, further comprising calculating a ratio between the first and second output signals and comparing the ratio to a range of ratios.

16. The method as defined in claim 14, further comprising generating an alert when one or more of the first output signal, the second output signal, or a ratio between the first and second output signals is out of a range.

17. The method as defined in claim 14, wherein the diagnostic information corresponds to at least one of a mechanical failure or an electrical failure of the sensor system.

18. A tangible machine readable medium having instructions stored thereon, which when executed, cause a machine to:
   measure a first output signal generated at a first magnetic field sensor, the first output signal generated in response to a magnetic field generated by a magnetic field source of a sensor system;
   measure a second output signal generated at a second magnetic field sensor, the second output signal generated in response to the magnetic field; and
   generate diagnostic information to determine an operating condition of the sensor system based on a comparison of a detected differential relationship between the first and second output signals over a range of motion of the magnetic field source to a characteristic differential line or curve that varies over the range of motion.

19. The tangible machine readable medium as defined in claim 18, wherein the magnetic field source comprises a magnet.

20. The tangible machine readable medium as defined in claim 19, wherein the magnet is fixed on a movable part.

* * * * *